(12) United States Patent
Mohan

(10) Patent No.: US 7,107,380 B1
(45) Date of Patent: Sep. 12, 2006

(54) CONFIGURATION FOR DOCKABLE PORTABLE COMPUTERS USING A SINGLE ETHERNET PHYSICAL LAYER CHIP AND TRANSFORMER

(75) Inventor: Jitendra Mohan, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 248 days.

(21) Appl. No.: 10/728,191

(22) Filed: Dec. 4, 2003

(51) Int. Cl.
G06F 13/00 (2006.01)
(52) U.S. Cl. ...................................... 710/303; 710/316
(58) Field of Classification Search ................ 710/100, 710/303, 304, 104, 316, 15–19; 709/239; 370/357, 360
See application file for complete search history.

(56) References Cited

U.S. PATENT DOCUMENTS 5,680,397 A * 10/1997 Christensen et al. ........ 370/421

2005/0097218 A1* 5/2005 Sultenfuss et al. .......... 709/238

OTHER PUBLICATIONS

Pericom's PI3L301D Application of the Week, Feb. 26, 2003.*
Optimizing Laptop Docking Station Designs Using LAN Switches, Jun. 12, 2002.*
Transformerless Ethernet and PICMG Applications, Vitesse, Sep. 20, 2004.*
LAN Magnetics, Tuan Khuu, Feb. 23, 2001.*

* cited by examiner

Primary Examiner—Khanh Dang

(57) ABSTRACT

A single 10/100/1000BT Ethernet network physical layer chip and a single transformer, both within a mobile computer, are employed to provide a network connection to the mobile computer either through a network connection interface within a docking station receiving the mobile computer, when the mobile computer is docked, or through a network connection interface within the mobile computer, when the mobile computer is not docked. Connection traces to the unused network connection interface have the characteristics of a small, unterminated stub, with any reflections handled by intrinsic echo cancellation during 1000BT operation and negligible during 10/100BT operation.

20 Claims, 2 Drawing Sheets

CONFIGURATION FOR DOCKABLE PORTABLE COMPUTERS USING A SINGLE ETHERNET PHYSICAL LAYER CHIP AND TRANSFORMER

TECHNICAL FIELD OF THE INVENTION

The present invention is directed, in general, to mobile computer systems and docking stations and, more specifically, to selective connection of mobile computers to a network either directly or through a docking station.

BACKGROUND OF THE INVENTION

Many new portable (or, equivalently, "laptop," "palmtop" or "mobile") computers include built-in Ethernet connections supporting 10/100/1000 mega-bits per second (Mbps) base data transfer rates on a twisted pair transmission medium (commonly referred to as 10/100/1000 Base-T or 10/100/1000BT). Such portable computers may selectively connect to docking stations or port replicators providing easy access to full-size peripherals (monitor, keyboard, mouse, etc.) together with a fixed Ethernet network connection.

As illustrated in FIGS. 3A and 3B, network connections both through the docking station to the mobile computer and directly into the mobile computer are currently supported by either (a) providing a 10/100/1000BT media access control (MAC) and physical layer (PHY) integrated circuit in both the mobile computer and the docking station, or (b) employing a switch integrated circuit (IC) within the mobile computer to demultiplex the output of a PHY IC (in the mobile computer), together with two transformers to ensure that the MAC-PHY IC sees only one transmission path at any given time and that problems relating to reflections from the unterminated (open or unused) network connections are thereby eliminated.

Both solutions incur the expense of duplicate or redundant components. Moreover, signal integrity suffers with use of a switch IC due to nonlinear switch resistance and/or parasitic capacitances, particularly when driving a signal over the power supply rail. This nonlinearity reduces performance, especially for 1000BT operation, with 100BT operation suffering some signal integrity loss and 10BT operation not being significantly affected.

There is, therefore, a need in the art for enabling use of a single PHY integrated circuit to provide a network connection both directly into a mobile computer and through a docking station, without duplication of components and without significant loss of signal integrity and performance at higher transmission rates.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

To address the above-discussed deficiencies of the prior art, it is a primary object of the present invention to provide, for use in a dockable mobile computer, a single 10/100/1000BT Ethernet network physical layer chip and a single transformer, both within the mobile computer, that are employed to provide a network connection to the mobile computer either through a network connection interface within a docking station receiving the mobile computer, when the mobile computer is docked, or through a network connection interface within the mobile computer, when the mobile computer is not docked. Connection traces to the unused network connection interface have the characteristics of an unterminated stub, with any reflections handled by intrinsic echo cancellation during 1000BT operation and negligible during 10/100BT operation.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the detailed description below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller might be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

Figure 1:
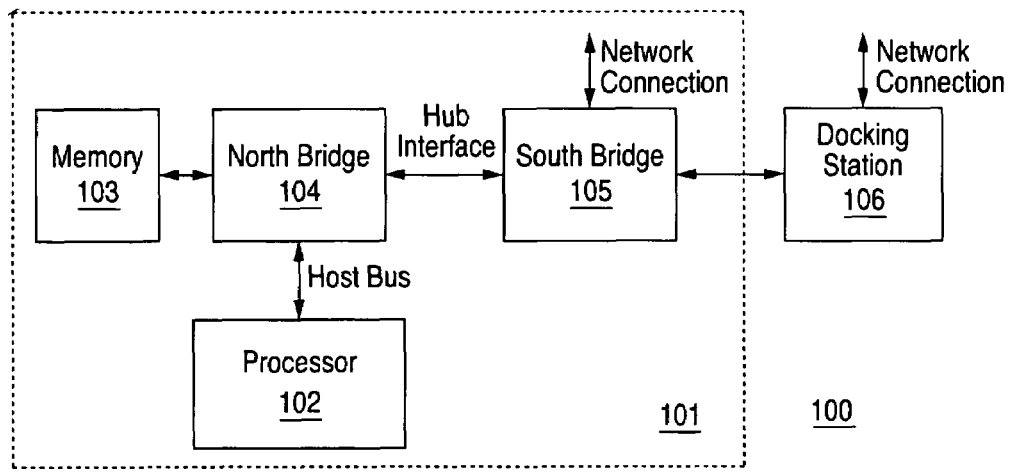
FIG. 1 depicts a block diagram for a mobile computer and docking station using a single Ethernet physical layer chip and transformer according to one embodiment of the present invention.
Figure 2:
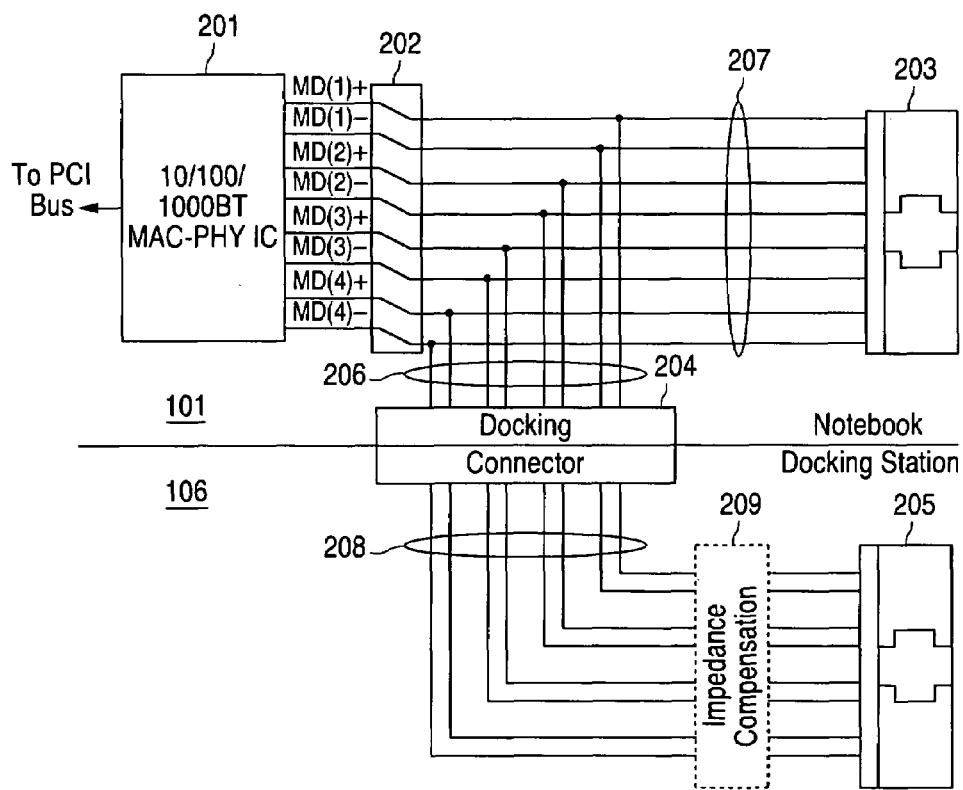
FIG. 2 depicts in greater detail a configuration for selective connection of a mobile computer to an Ethernet network either directly or through a docking station using a single Ethernet physical layer chip and transformer according to one embodiment of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a block diagram for a mobile computer and docking station using a single Ethernet physical layer chip and transformer according to one embodiment of the present invention. Those skilled in the art will recognize that the full construction and operation of a mobile computer is not depicted and described. Instead, for simplicity and clarity, only so much of a mobile computer as is unique to the present invention or necessary for an understanding of the present invention is depicted or described.

Mobile computer system 100 includes mobile computer 101 containing a processor 102, main memory 103, and bridges 104 and 105 enable the processor 101 to interface with other system elements. Processor 101 employs a memory controller host or "north bridge" 104 to interface with main memory 103 and graphics units (not shown). Processor 101 employs an interface controller host or "south bridge" 105, coupled to the north bridge 104 by a hub interface, to interface with other devices over standard, general-purpose buses such as a Peripheral Component Interconnect (PCI) bus.

Mobile computer 101 is configured for selective connection to a docking station 106 (as used herein, "docking station" is intended to include port replicators) using physical and electrical connectors in accordance with the known art. Mobile computer 101 includes a connector, described in further detail below, for wired connection to an Ethernet network through, for example, a card within a PCI bus slot coupled to south bridge 105. Alternatively mobile computer 101, when docked in docking station 106, is connected to an Ethernet network through the docking station 106, also through the same card within the PCI bus slot. Alternatively, the physical layer controller could be present on the mobile computer motherboard itself and operate in a fashion functionally similar to the previous example.

FIG. 2 depicts in greater detail a configuration for selective connection of a mobile computer to an Ethernet network either directly or through a docking station using a single Ethernet physical layer chip and transformer according to one embodiment of the present invention. A single Ethernet MAC-PHY chip 201 within mobile computer 101 is employed for network connection both directly and through the docking station 106. In addition, only a single transformer 202 is employed, and no switch integrated circuit (or "switch IC," an analog demultiplexor routing an input signal to one of a number of possible outputs based on a control signal) is necessary. The present invention thus does away with the switch IC and one of the transformers for the implementation in FIG. 3B.

The pins of the physical layer chip 201, which are sensitive to parasitic capacitances, are connected to a transformer 202. The secondary side of the transformer 202 is routed directly to an interface 203 within the mobile computer 101 to a Category 5 (CAT-5) transmission medium connector, such as a RJ-45 connector, as well as to the docking connector 204. The docking connector 204 is, in turn, also a connector to a CAT-5 transmission medium interface 205. The interfaces 203 and 205 are then used to drive signals over up to and often beyond 100 meters (m) of CAT-5 cable to a network packet switch or a router.

Use of a single physical layer chip 201 and transformer 202 in the manner described above is possible for 1000BT operation for several reasons. First, when the mobile computer 101 is not docked, the connection traces 206 between the docking connector 204 and the signal lines 207 between transformer 202 and interface 203 have the characteristics of a small stub. Since 1000BT physical layer implementations are echo cancelled systems (i.e., full duplex with reflection cancellation, including Near End Crosstalk or "NEXT") under the Ethernet standard, reflections resulting from the unterminated stub can be handled without performance degradation as long as the echo cancellation and NEXT taps have sufficient dynamic range.

Second, while the connection traces 206 combine with the docking connector 204 and connection traces 208 within the docking station 106 to form a longer stub when the mobile computer 101 is docked, the network connection when the mobile computer 101 is docked is presumed to be through the docking station 106. Transmission mismatches in the through direction thus become part of the cable plant, and can be handled by the adaptive equalizer present in the far end receiver (not shown). When the mobile computer 101 is docked, the portion of signal lines 207 between interface 203 and the connection points for connection traces 206 has the characteristics of a small, unterminated stub.

For 10/100BT operation, different wires are used for transmit and receive, such that the system is not very sensitive to echo or near end crosstalk (NEXT). Even if reflection cancellation is not enabled, 10/100BT signaling is not full duplex, so reflections are not a significant problem. In addition, 10/100BT operation provides more signal margin.

Docking station 106 (and/or optionally notebook 101) may optionally include impedance compensation 209 within the signal path between docking connector 204 and interface 205. Impedance compensation 209 may be necessary near the interface 205 to meet Institute for Electrical and Electronics Engineers (IEEE) specifications for the transmitter in view of the return loss created by long traces within docking station 106 and docking connector discontinuities. Impedance compensation 209 may be implemented by a full inductive-capacitive network, a transformer, or other passive components such as a capacitive network.

Figure 3A:
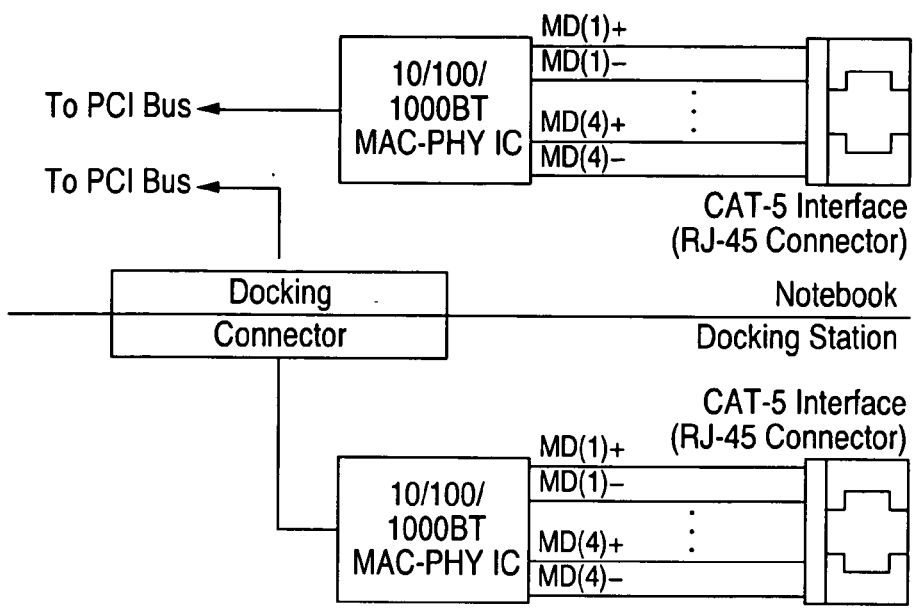
FIGS. 3A and 3B illustrate current configurations for selective connection of a mobile computer to an Ethernet network either directly or through a docking station.
Figure 3B:
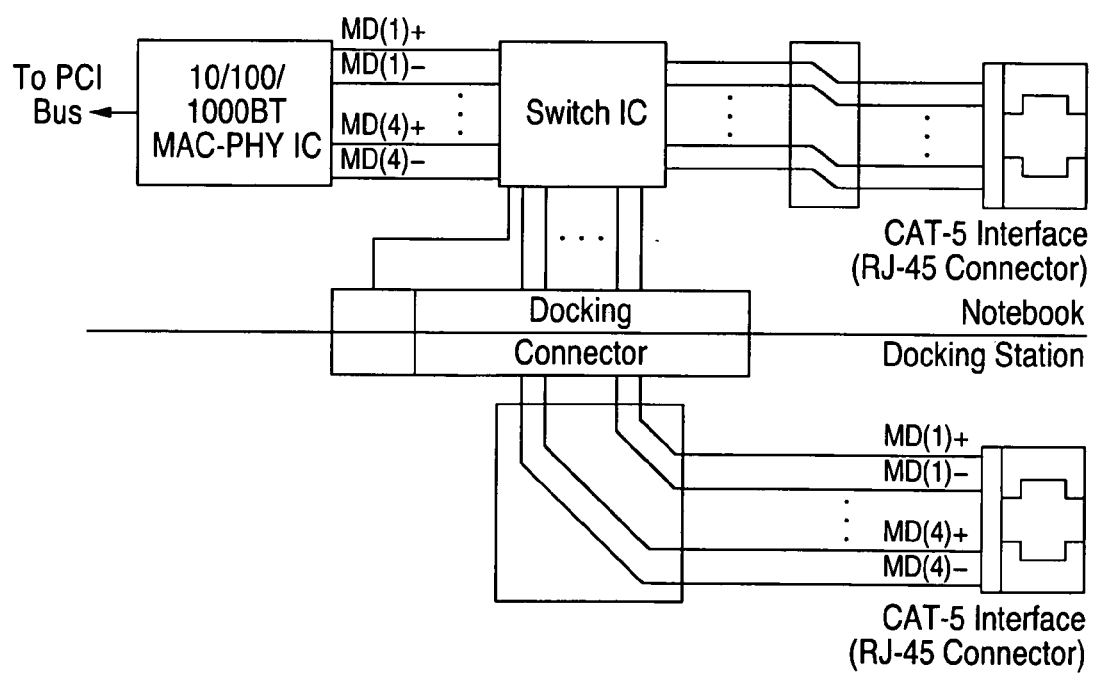

Since the switch IC that only enables one path at a time in the embodiment of FIG. 3B is eliminated, the case when a cable is plugged in to both RJ-45 connectors 203 and 205 may be detected by the system 100 and a warning issued to remove one of the cables for the system to function correctly.

The present invention allows a single physical layer chip and a single transformer to be employed by a mobile computer for connection to a network either directly from the mobile computer, when the mobile computer is not docked, or through a docking station, when the mobile computer is docked. Reflection cancellation enabled in 1000BT operation handles reflections resulting from the unterminated stub, while adaptive equalization at the far end receiver handles transmission mismatches. 10BT and 100BT operation is not full duplex, so reflections do not present a significant problem even if reflection cancellation is not enabled.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A network connection system comprising:
   a physical layer integrated circuit processing network data transmissions;
   a transformer connected to the physical layer chip;
   a network transmission medium interface directly connected to a secondary side of the transformer; and a first portion of a docking connector also directly connected to the secondary side.

2. The network connection system according to claim 1, wherein the first portion of the docking connector is connected to signal traces between the transformer and the first network transmission medium interface.

3. The network connection system according to claim 1, wherein the physical layer integrated circuit selectively provides one or more of a 0/100/1000BT connection to an Ethernet network.

4. The network connection system according to claim 1, wherein the network transmission medium interface is a first network transmission medium interface and wherein a second portion of the docking connector is coupled to a second network transmission medium interface.

5. The network connection system according to claim 4, wherein the first and second network transmission medium interfaces are RJ-45 connectors.

6. The network connection system according to claim 4, wherein the first network transmission medium interface and the first portion of the docking connector are disposed within a mobile computer and the second network transmission medium interface and the second portion of the docking connector are disposed within a docking station selectively receiving the mobile computer.

7. A mobile computer system including the network connection system according to claim 6, the mobile computer system further comprising:
 a processor within the mobile computer coupled by one or more interface devices to the physical layer integrated circuit; and
 connections within the docking station for one or more peripherals including a monitor, a keyboard or a mouse.

8. A mobile computer including the network connection system according to claim 1, the mobile computer further comprising:
 a processor coupled by one or more interface devices to the physical layer integrated circuit.

9. A method of providing a network connection comprising:
 processing network data transmissions within a physical layer integrated circuit connected to a transformer, wherein a network transmission medium interface and a first portion of a docking connector are directly connected to a secondary side of the transformer.

10. The method according to claim 9, further comprising:
 driving signals on signal traces between the transformer and the network transmission medium interface, wherein the first portion of the docking connector is connected to the signal traces.

11. The method according to claim 9, further comprising:
 selectively providing one or more of a 10/100/1000BT connection to an Ethernet network in the physical layer integrated circuit.

12. The method according to claim 9, further comprising: connecting the first portion of the docking connector to a second portion of the docking connector, wherein the network transmission medium interface is a first network transmission medium interface and wherein the second portion of the docking connector is coupled to a second network transmission medium interface.

13. The method according to claim 12, wherein the first and second network transmission medium interfaces are RJ-45 connectors.

14. The method according to claim 12, wherein the first network transmission medium interface and the first portion of the docking connector are disposed within a mobile computer and the second network transmission medium interface and the second portion of the docking connector are disposed within a docking station selectively receiving the mobile computer.

15. The method according to claim 9, further comprising:
 checking for concurrent connection of the network transmission medium interface to a network transmission medium and coupling of the first portion of the docking connector to a network transmission medium; and
 responsive to detecting both connection of the network transmission medium interface to a network transmission medium and coupling of the first portion of the docking connector to a network transmission medium, issuing an alert.

16. A network connection system comprising:
 a docking connector having first and second portions configured to be selectively engaged to provide an electrical connection;
 first and second network connection interfaces, wherein the second network connection interface is coupled to the second portion of the docking connector; and
 a transformer connected to a network physical layer chip, wherein a secondary side of the transformer is connected directly connected to the first network connection interface and the first portion of the docking connector.

17. The network connection system according to claim 16, further comprising:
 impedance compensation within the connection between the second portion of the docking connector and the second network connection interface.

18. The network connection system according to claim 17, wherein the network physical layer integrated circuit selectively provides one or more of a 10/100/1000BT connection to an Ethernet network.

19. The network connection system according to claim 18, wherein the first and second network connection interfaces are RJ-45 connectors.

20. The network connection system according to claim 19, wherein the first network connection interface, the first portion of the docking connector, the transformer, and the network physical layer integrated circuit are disposed within a mobile computer, and wherein the second network connection interface and the second portion of the docking connector are disposed within a docking station.

* * * * *

UNITED STATES PATENT AND TRADEMARK OFFICE
CERTIFICATE OF CORRECTION

| | | |
|---|---|---|
| PATENT NO. | : 7,107,380 B1 | Page 1 of 1 |
| APPLICATION NO. | : 10/728191 | |
| DATED | : September 12, 2006 | |
| INVENTOR(S) | : Jitendra Mohan | |

It is certified that error appears in the above-identified patent and that said Letters Patent is hereby corrected as shown below:

Column 5, claim 3, line 9, delete "0/100/1000BT" and replace with --10/100/1000BT--.

Signed and Sealed this

Ninth Day of January, 2007

JON W. DUDAS
*Director of the United States Patent and Trademark Office*